(12) United States Patent
Angell et al.

(10) Patent No.: US 9,290,727 B2
(45) Date of Patent: Mar. 22, 2016

(54) WATER-SOLUBLE POUCH COATED WITH A COMPOSITION COMPRISING SILICA FLOW AID

(71) Applicant: The Procter & Gamble Company, Cincinnati, OH (US)

(72) Inventors: Adrian John Wayneforth Angell, West Chester, OH (US); Scott William Capeci, North Bend, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/944,907

(22) Filed: Jul. 18, 2013

(65) Prior Publication Data

US 2014/0024574 A1  Jan. 23, 2014

Related U.S. Application Data

(60) Provisional application No. 61/673,851, filed on Jul. 20, 2012.

(51) Int. Cl.
| | | |
|---|---|---|
| *C11D 17/04* | (2006.01) | |
| *C11D 17/00* | (2006.01) | |
| *B65D 75/26* | (2006.01) | |

(52) U.S. Cl.
CPC ............ *C11D 17/0039* (2013.01); *B65D 75/26* (2013.01); *C11D 17/042* (2013.01); *Y02W 90/11* (2013.01)

(58) Field of Classification Search
CPC ............ C11D 17/0039; C11D 17/042; C11D 17/043; C11D 17/044; B65D 65/42; B65D 65/46
USPC .................. 510/296, 439, 507, 511
See application file for complete search history.

(56) References Cited

U.S. PATENT DOCUMENTS

| | | | |
|---|---|---|---|
| 2,220,099 A | 11/1940 | Guenther et al. | |
| 2,477,383 A | 7/1949 | Lewis | |
| 3,664,961 A | 5/1972 | Norris | |
| 3,919,678 A | 11/1975 | Penfold | |
| 4,222,905 A | 9/1980 | Cockrell, Jr. | |
| 4,239,659 A | 12/1980 | Murphy | |
| 4,605,509 A | 8/1986 | Corkill et al. | |
| 5,137,646 A | 8/1992 | Schmidt et al. | |
| 6,423,679 B1 | 7/2002 | Capeci et al. | |
| 6,767,883 B2* | 7/2004 | Barbuzzi et al. | 510/441 |
| 6,924,258 B2 | 8/2005 | Delamarche et al. | |
| 6,995,126 B2 | 2/2006 | Perkis et al. | |
| 7,125,828 B2 | 10/2006 | Catlin et al. | |
| 7,127,874 B2 | 10/2006 | Viltro et al. | |
| 7,563,757 B2* | 7/2009 | Kouvroukoglou et al. | 510/296 |
| 7,797,912 B2 | 9/2010 | Hammond et al. | |
| 2002/0165109 A1 | 11/2002 | Cropper et al. | |
| 2003/0060390 A1 | 3/2003 | Demeyere et al. | |
| 2003/0100461 A1 | 5/2003 | Catlin et al. | |
| 2003/0100463 A1 | 5/2003 | Delamarche et al. | |
| 2003/0126282 A1 | 7/2003 | Sarkar et al. | |
| 2003/0139312 A1 | 7/2003 | Caswell et al. | |
| 2004/0186036 A1* | 9/2004 | Smadi et al. | 510/417 |
| 2004/0204337 A1 | 10/2004 | Corona, III et al. | |
| 2006/0063691 A1* | 3/2006 | Carlomagno et al. | 510/295 |
| 2006/0083876 A1 | 4/2006 | Catlin et al. | |
| 2006/0160711 A1* | 7/2006 | Frank | 510/101 |
| 2006/0217288 A1* | 9/2006 | Wahl et al. | 510/515 |
| 2006/0257596 A1 | 11/2006 | Catalfamo et al. | |
| 2006/0275566 A1* | 12/2006 | de Buzzaccarini et al. | 428/35.2 |
| 2007/0219111 A1 | 9/2007 | Ward et al. | |
| 2007/0241022 A1 | 10/2007 | Denome et al. | |
| 2009/0088363 A1* | 4/2009 | Panandiker et al. | 510/343 |
| 2009/0199877 A1 | 8/2009 | Koch et al. | |
| 2009/0209445 A1* | 8/2009 | Panandiker et al. | 510/296 |
| 2010/0081600 A1* | 4/2010 | Boutique et al. | 510/295 |
| 2010/0190679 A1* | 7/2010 | Vanpachtenbeke et al. | 510/347 |
| 2010/0305020 A1 | 12/2010 | Jennewein | |
| 2011/0188784 A1 | 8/2011 | Denome et al. | |
| 2011/0204087 A1 | 8/2011 | Kopulos et al. | |
| 2012/0294969 A1 | 11/2012 | Koch et al. | |
| 2013/0240388 A1 | 9/2013 | Koch et al. | |
| 2013/0273277 A1* | 10/2013 | Lee et al. | 428/35.2 |

FOREIGN PATENT DOCUMENTS

| | | |
|---|---|---|
| EP | 0618290 A1 | 10/1994 |
| WO | WO2008053379 A2 | 5/2008 |

OTHER PUBLICATIONS

PCT Search Report and written opinion dated Oct. 24, 2013 , PCT/US2013/050976.

\* cited by examiner

*Primary Examiner* — Lorna M Douyon
(74) *Attorney, Agent, or Firm* — Gregory S. Darley-Emerson; Leonard W. Lewis; Steven W. Miller

(57) ABSTRACT

Water-soluble pouches comprise water-soluble films coated by a composition. The composition comprises silica flow aid and an absorbent material selected from the group consisting of zeolite; over-dried zeolite; talc; starch; zinc stearate; calcium stearate; micronized calcium carbonate; sodium carbonate; micronized sodium sulphate; and combinations thereof.

7 Claims, No Drawings

WATER-SOLUBLE POUCH COATED WITH A COMPOSITION COMPRISING SILICA FLOW AID

FIELD OF THE INVENTION

This disclosure relates to a water-soluble pouch containing a first composition, an outer surface of which is coated with a second composition.

BACKGROUND OF THE INVENTION

Water-soluble pouches containing compositions are known in the art. For example, water-soluble pouches are used to package household care compositions including, but not limited to, laundry or dishwashing detergents or additives. A consumer can directly add the pouched composition to a mixing vessel, such as a bucket, sink or washing machine. Advantageously, this provides for accurate dosing while eliminating the need for the consumer to measure the composition.

Water-soluble pouches may contain compositions that comprise liquid including, but not limited to, water. The film materials used to make the water-soluble pouches are often permeable such that liquid contained within the pouch may migrate across the film. One such example of a common film material is polyvinyl alcohol (hereinafter "PVOH").

Liquid migration from the composition contained inside the water-soluble pouch to the outside surface of the pouch is referred to herein as "weeping." Weeping can lead to several undesirable outcomes. First, the outside surface of the pouch may become tacky. The tackiness can impede the flow of the water-soluble pouches along the pouch production line. For example, tacky pouches may stick together when flowing through the pouch counting and packing system. This can result in an inaccurate number of pouches being packed into a secondary container. Second, the weeping may cause the outside of the pouches to feel greasy to the touch.

Moisture from the air for example from ambient humidity may also cause the outside surface of the pouch to become tacky. This can also result in problems with sticky pouches and/or pouches that feel greasy to the touch.

One means of overcoming the aforementioned problems is to dust the outer surface of a water-soluble pouch with zeolite powder. In order to effectively coat the pouch, over-dried zeolite is preferred, due to its flow properties and its ability to effectively disperse and coat pouches. Without wishing to be bound by theory, it is believed that the structure of over-dried zeolite allows for capture of the liquid that is present on the surface of the film that is coated with the over-dried zeolite. While it is effective, over-dried zeolite can be difficult to manage due to its relatively short shelf life, its sensitivity to moisture pick up prior to use, the exothermic reaction when moisture or solvent enters the zeolite surface structures, and the expense to produce and supply such a sensitive material.

Regular zeolite (i.e., zeolite that has not been over-dried) can be a poor substitute for over-dried zeolite for a number of reasons. First, regular zeolite has a propensity for inconsistent flow through manufacturing processes. This can lead to poor dispersion and under or over coating of pouches. If under-coated, the pouches may have a tendency to display weeping. If overcoated, this can lead to pouches with a visible powder coating, resulting in a pouch appearance which may be unacceptable to consumers. When any zeolite is loaded with perfume or other actives, the flow properties of these powders are similarly poor and have the same issues when applied to coat pouches. Thus while zeolite will adequately perform as a coating in the present invention, over-dried zeolite will perform superiorly.

Thus there remains a need for a water-soluble pouch that is coated with a substance that will ameliorate the aforementioned problems. The substance should be delivered uniformly to the pouches and adhere consistently to the pouches, to allow for a relatively uniform distribution of powder on each pouch; this will result in a water-soluble pouch with desirable aesthetics.

SUMMARY OF THE INVENTION

The present disclosure addresses the aforementioned needs by providing for a water-soluble pouch coated with a composition that will ameliorate the effects of weeping, and that will provide for efficient flow of the composition through the orifices that form portions of the pouch production line, and that provides for desirable coating aesthetics.

One embodiment is a water-soluble pouch comprising a first sheet of water-soluble material molded to form a body portion of the pouch. The pouch contains a first composition and an outer surface of the pouch has a coating of a second composition. The second composition comprises absorbent material selected from the group consisting of: zeolite; over-dried zeolite; zeolite loaded with perfume and/or other actives; talc; starch; zinc stearate; calcium stearate; micronized calcium carbonate; sodium carbonate; micronized sodium sulphate; and mixtures thereof. The second composition further comprises silica flow aid. Without wishing to be bound by theory, it is believed that the flow aid coats the particles which make up the absorbent material. Thus crevices on the surface of the absorbent material are filled and allow for the friction between the particles to be reduced such that flow is improved.

DETAILED DESCRIPTION OF THE INVENTION

Unless stated otherwise herein, the cited percentages are calculated based on the total weight of a composition.

"Regular zeolite" is used interchangeably herein with "zeolite." Zeolite refers to aluminosilcates having the empirical formula $M_z[(AlO_2)_2(SiO_2)_y].xH_2O$ wherein z and y are integers of at least 6, the molar ratio of z to y is from about 0.5 to about 5, M is a suitable countercation such as an alkali metal, for example sodium, or an alkaline earth metal, and x is from about 10 to about 264. Zeolite and over-dried zeolite are described as follows. Suitable zeolites include sodium aluminosilicates available under the designations zeolite A, zeolite P(B), zeolite MAP, zeolite X and zeolite Y. Zeolite A has the following formula: $Na_{12}[(AlO_2)_{12}(SiO2)_{12}].xH_2O$ wherein x is from about 20 to about 30, or from about 25 to about 30, especially about 27.

"Over-dried zeolite" has the same formula as zeolite, with the exception that x<0.85*{the stoichiometric equivalent}. Suitable over-dried zeolite includes Zeolite A with x<20. Over-dried zeolite may be particularly useful when a low moisture environment is required, for example in the presence water susceptible materials like water soluble film.

"Comprising" as used herein means that various components, ingredients or steps can that be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein.

Water-Soluble Pouch

The present disclosure relates to water-soluble pouches made from water-soluble film. The pouches contain a first composition and are coated by a second composition. The pouch can be of any form, shape and material which are suitable to contain the first composition, without allowing for release of the first composition from the pouch prior to use. The exact execution may depend upon the type and amount of the first composition in the pouch, the number of compartments in the pouch, and/or the characteristics required for the pouch to hold, protect, deliver and release the compositions. The pouch may be of such a size that it conveniently contains a suitable amount of the first composition for the required operation. For example, the pouch may contain enough of the first composition for washing one load of clothing or dishes.

The pouches herein can comprise a single compartment or multiple compartments. If the pouch has multiple compartments, one or more of the different compartments can contain the same composition or, in the alternative, can contain different compositions. The pouches described herein may be of particular use in an automatic dishwasher or an automatic laundry washing machine.

Pouch Manufacturing Process

Unit dose pouches are made using suitable equipment and methods. For example, unit dose pouches are made using vertical form filling, horizontal form filling, and/or rotary drum filling techniques commonly known in the art. Such processes may be either continuous or intermittent. Examples of continuous in-line processes of manufacturing water-soluble containers are set forth in U.S. Pat. No. 7,125,828, U.S. 2009/0199877A1, EP 2380965, EP 2380966, U.S. Pat. No. 7,127,874 and US2007/0241022 (all to Procter & Gamble Company, Ohio, USA). Examples of non-continuous in-line processes of manufacturing water-soluble containers are set forth in U.S. Pat. No. 7,797,912 (to Reckitt Benckiser, Berkshire, GB). Each of these processes may utilize a platen comprising a plurality of mold cavities.

Generally, the process may comprise the following steps. A film is heated and/or wetted and fed onto the surface of the platen. Once on the surface of the platen, the film can be held in position by any means. For example, the film can be held in position through the application of vacuum on the film, thus pulling the film in a fixed position on the surface. The vacuum may be applied along the edges of the film and/or on the surface area between the mold cavities. The platen surface may have at least some holes connected to a unit which can provide a vacuum as is known in the art.

Any film that is suitable for making a water-soluble dose pouch is used. Non-limiting examples of water-soluble films that are used include those comprising PVOH as described in: U.S. 2011/0204087A1 and U.S. 2011/0188784A1 (each to Procter & Gamble Company, Ohio, USA). Further non-limiting examples include commercially available films including: M8630 and M8900 supplied by MonoSol (Gary, Ind., USA) and/or films known under trade reference Solublon® of films supplied by Aicello (North Vancouver, BC, Canada) or Poval film supplied by Kuraray (Houston, Tex., USA).

Once open pockets of film are formed into the mold cavities, they may be filled with composition and sealed by any known method, including those described in the patent publications listed above. The sealing step typically is accomplished by sealing a second water-soluble film to the open top of the pocket. In some embodiments, the second water-soluble film may itself form a portion of one or more composition containing pockets. Non-limiting filling and sealing means are described in U.S. Pat. No. 6,995,126, U.S. Pat. No. 7,125,828, U.S. 2009/0199877A1, EP 2380965, EP 2380966, U.S. Pat. No. 7,127,874 and US2007/0241022 (all to The Procter & Gamble Company, Ohio, USA).

First Composition

The water-soluble pouches of the present invention may contain a variety of first compositions. Non-limiting examples include cleaning compositions, fabric care compositions and hard surface cleaners. More particularly, the compositions may be a laundry, fabric care or dish washing composition including, pre-treatment or soaking compositions and other rinse additive compositions.

The present pouches may contain various compositions. A multi-compartment pouch may contain the same or different compositions in each separate compartment. This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0 (filed Jun. 2, 2009 and assigned to The Procter & Gamble Company).

Non-limiting examples of useful compositions include light duty and heavy duty liquid detergent compositions, hard surface cleaning compositions, fabric enhancers, detergent gels commonly used for laundry, and bleach and laundry additives, shampoos, body washes, and other personal care compositions. Compositions of use in the present pouches may take the form of a liquid, gel, paste, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect. If the composition is a liquid or gel, the total amount of water may be less than about 25%, less than about 10%, from about 1% to about 9% or from about 1% to about 9% by weight of composition. This is on the basis of free water added to the composition. Note that solid and powder compositions can contain small amounts of liquid such as water or other solvents.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; structurant (for example, hydrogenated castor oil); suds suppressors, e.g., silicone suds suppressors (see: U.S. Publication No. 2003/0060390 A1, ¶ 65-77); cationic starches (see: U.S. 2004/0204337 A1 and U.S. 2007/0219111 A1); scum dispersants (see: U.S. 2003/0126282 A1, ¶89-90); dyes; colorants; opacifier; antioxidant; hydrotropes such as toluene-sulfonates, cumenesulfonates and naphthalenesulfonates; color speckles; colored beads, spheres or extrudates; clay softening agents. Any one or more of these ingredients is further described in described in European Patent Application Number 09161692.0 (filed Jun. 2, 2009), U.S. Publication Number 2003/0139312A1 (filed May 11, 2000) and U.S. Patent Application No. 61/229,981 (filed Jul. 30, 2009), each of which are assigned to the Procter & Gamble Company. Additionally or alternatively, the compositions may comprise surfactants and/or solvent systems, each of which is described below.

The first composition may comprise a surfactant. The first composition may comprise from about 1% to about 80%, or from about 5% to about 50%, by weight of the first composition, of a surfactant. Detersive surfactants utilized can be of the anionic, nonionic, zwitterionic, ampholytic or cationic type or can comprise compatible mixtures of these types. In some aspects, surfactants are selected from the group consisting of anionic, nonionic, cationic surfactants and mixtures thereof. In some aspects, the compositions are substantially free of betaine surfactants. Detergent surfactants useful herein are described in U.S. Pat. Nos. 3,664,961; 3,919,678; 4,222,905; and 4,239,659, incorporated herein by reference. Anionic and nonionic surfactants are particularly useful.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and may comprise from about 12 to about 18 carbon atoms. Soaps can be made by direct saponification of fats and oils or by the neutralization of free fatty acids. Suitable soaps are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, for example the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, or from 12 to 18 carbon atoms, and wherein the polyethoxylate chain contains from 1 to 15, or from 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Suitable nonionic surfactants may include those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Other suitable nonionic surfactants include condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

The first composition may comprise a solvent system. The solvent system in the present compositions can be a solvent system containing water alone or mixtures of organic solvents with water. Useful organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, or at least about 1% to about 50%, more or from about 5% to about 25%, by weight of the first composition.

The first compositions described herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful first compositions may be about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of about 4 to about 8.

When the first composition is a liquid or a gel, the pH of the first composition is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the liquid or gel first composition is prepared according to the following procedure. A sample of 10±0.05 grams is weighted with a balance capable of accurately measuring to ±0.02 grams. The sample is transferred to the a 100 mL volumetric flask, diluted to volume with purified water (deionised and/or distilled water are suitable as long as the conductivity of the water is <5 S/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered first compositions, the pH a 1% aqueous solution of the first composition is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5 S/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Second Composition

The second composition comprises absorbent material. The second composition may comprise up to about 80% or up to about 90%, or up to about 95%, or up to about 98%, or up to about 99%, or up to about 99.5%, or up to about 99.75%, or up to about 99.95%, by weight of the second composition, of absorbent material. The second composition may comprise from about 50% to about 99.95%, by weight of the second composition, of absorbent material. The absorbent material may be selected from the group consisting of: zeolite; over-dried zeolite; any of these types of zeolite loaded with perfume and/or other actives; talc; starch; zinc stearate; calcium stearate; micronized calcium carbonate; sodium carbonate; micronized sodium sulphate; and mixtures thereof. In some aspects, the absorbent material is selected from the group consisting of regular zeolite, over-dried zeolite, any of these types of zeolite loaded with perfume and/or other actives, and mixtures thereof. In some aspects, the absorbent material is regular zeolite. Zeolite is available, for example, from PQ Corporation (Malvern, Pa.) under the tradename VALFOR® 100. Suitable zeolites are also described in U.S. Pat. Nos. 4,605,509 and 6,423,679, incorporated herein by reference.

The second composition further comprises silica flow aid. The silica flow aid may be selected from the group consisting of: fumed silica; precipitated silica; and mixtures thereof. Silica flow aids include, but are not limited to hydrophobic silica flow aids. An example of a hydrophobic silica flow aid is available under the trade name Aerosil R 972 (Evonik Industries, Parsippany, N.J., USA). Aerosil R 972 is a fumed silica after-treated with dimethyldichlorosilane. Silica flow aid may be present in the second composition at a weight percentage of from about 0.05% to about 50%, from about 0.05% to about 25%, from about 0.05% to 5%, from about 0.1% to about 3%, or from about 1% to about 5%, by weight of the second composition. In second compositions consisting essentially of absorbent material and silica flow aid, the absorbent material forms the balance of the second composition.

The absorbent material may have an average particle size of from about 0.5 µm to about 50 µm, or from about 1 µm to about 10 µm, or from about 3 µm to about 5 µm. The silica flow aid may have an average particle size of from about 0.1 nm to about 1000 nm, or from about 0.5 nm to about 100 nm, or from about 1 nm to about 20 nm. Particle size can be determined with a Laser Diffraction based Particle Size Analyzer "MASTERSIZER® Type S Long Bed 2.18" of Malvern Instruments, Malvern, England. Additional methods and parameters useful in quantifying the components of the second composition may be found in U.S. Pat. No. 6,924,258 to Delamarche et al., issued Aug. 2, 2005, incorporated herein by reference.

Methods of Coating

The second composition can be applied to the pouch material by any suitable means. One such means is the suspension of the second composition in a non-aqueous solvent which is then atomized and sprayed onto the pouch. However, this process may generate a significant amount of left-over solvent which may be hazardous in nature and may need to be recuperated and condensed.

In an alternative process, the second composition can be applied to the pouch material via rotating brushes which are in contact with the composition. In yet another process, gravity is used to make pouches slide over a dusted surface. The transfer of the second composition and the movement of the pouches may be enhanced by vibrating this surface. In yet another process, the second composition maybe applied using the falling curtain method.

These processes have the advantage that they need not rely on solvents. However, it can be difficult to control the quantity of composition applied to the pouches when using this process.

Preferred processes involve fluidization of the coating powder. In one such process, the second composition is fluidized in air, using a fluidization chamber such as a fluidized bed produced by Niro A/S, Soeborg, Denmark. The fluidized composition is then brought into contact with the pouch material. This can be done by pneumatically conveying the fluidized second composition and directing the resulting powder stream at one or more pouches. Pneumatic conveying systems are available from Clyde Pneumatic Conveying Ltd., Doncaster, England. This process can be continuous or intermittent.

In a preferred coating process, one or more stationary powder spray guns are used to direct a powder stream of the second composition towards the pouches which are transported through a pouch coating zone by means of a belt conveyor. While some powder will remain on the pouches, it is not unusual that as much as 50% or even as much as 75% of the fluidized powder does not contact the pouches, either because it is not brought into contact with the pouch or because it does not adhere to the pouch with sufficient force. This over-sprayed powder can be recuperated, separated from the fluidization air by means of filters and/or cyclones and recycled into a powder reservoir.

The coating processes may additionally employ electrostatic forces in order to enhance the attraction between the second composition and the pouch. Thus the coating process may be based on negatively charging the powder particles comprising the composition and directing these charged particles to the grounded pouches. However, other arrangements are possible and may be preferred depending on the powder. A preferred powder for use with the electrostatic coating process is zeolite. Zeolite can be effectively charged when an electrode is built into the powder spray gun. The electrode may be charged with up to 100 kV (DC). The resulting powder distribution is very uniform. It is especially advantageous to use this method, because the charged powder tends to adhere to the side of the pouch which is opposite to the spray gun. Moreover, the adhesion between charged zeolite and a pouch can be stronger than the adhesion between normal (uncharged) zeolite and a pouch. As a result, the processing time is reduced and powder losses in following processing steps are reduced. Electrostatic powder coating systems are available from Nordson Corporation, Westlake, Ohio, USA.

When the pouch is coated with the second composition, a coated pouch may be formed. The coated pouch may comprise from about 0.0001% to about 0.1%, or from about 0.005% to about 0.01%, by weight of the coated pouch, of the second composition.

EXAMPLES

Example I

An embodiment of the present disclosure is made as follows. A section of water-soluble, PVOH based film with a thickness of 76 micrometer (Monosol M8630 film, from Monosol Corp.) is placed over the molds of a horizontal thermoforming machine. The molds are of a square shape with an approximate dimension of 55 mm×55 mm. The film is drawn into the molds by a vacuum applied through vacuum ports in the mold. The film is carefully heated to facilitate its deformation. 52 ml of an essentially water-free, liquid cleaning composition is then added to the thermoformed film cavity. A second layer of film is then coated with a thin layer of a water-based solvent and placed above the filled cavities where it is sealed to the first layer of film.

400 pouches are prepared by this method. These pouches are subsequently treated as follows. Sodium aluminosilicate (zeolite A) was obtained from Industrial Chemicals Ltd. of London. The zeolite is blended with 2% of silica (Aerosil R972), from Evonik Industries, using a Cuisinart food blender. The zeolite/silica powder blend is fluidized in a fluidization hopper (from Nordson Inc., part no. 139364) using dry compressed air. The hopper is placed on a vibrating table to enhance particle fluidization. A pneumatically activated powder pump (Nordson Inc. P/N 165637) is used to convey the powder from the hopper to a powder spray gun (Nordson Inc. type Versa Spray II IPS, P/N 107016E). The powder transfer rate is controlled from the control unit (Nordson Inc. P/N 106991C). A pressure setting of 0.9 bar is used for the atomization air, a setting of 2.5 bar is used for the fluidization air. This results in a powder transfer rate of around 0.2 kg/hr. The charge of the electrode inside the powder spray gun is set to approximately 65 kV. The powder spray gun is then placed inside a ventilated booth (Nordson Inc. type Micromax) to ensure that no powder dust escapes. A mesh belt (Wirebelt Ltd, UK) traverses the booth. The powder gun is placed below the mesh belt, such that the powder is sprayed upwards. At the tip of the spray gun, a flat spray nozzle is fitted such that the plane of the powder spray is perpendicular to the direction of the belt. Pouches are placed onto the belt at the feeding side such that the thermoformed side is in contact with the belt. They are then spray coated and collected at the discharge side of the belt. By this method there is a uniform distribution of powder coating, whereby a majority of pouches have powder levels in the optimal range for good handling (i.e. they are not sticky) and have good aesthetics (i.e. no visible powder clumps on the pouches).

Comparative Example I

A section of water-soluble, PVOH based film with a thickness of 76 micrometer (Monosol M8630 film, from Monosol Corp.) is placed over the molds of a horizontal thermoforming machine. The molds are of a square shape with approximate dimension of 55 mm×55 mm. The film is drawn into the molds by a vacuum applied through vacuum ports in the mold. The film is carefully heated to facilitate its deformation. 52 ml of an essentially water-free, liquid cleaning composition are then added to the thermoformed film cavity. A second layer of film is then coated with a thin layer of a water-based solvent and placed above the filled cavities where it is sealed to the first layer of film.

400 pouches are prepared by this method. These pouches are subsequently treated as follows. Sodium aluminosilicate (zeolite A) was obtained from Industrial Chemicals Ltd. of London. The zeolite powder is fluidized in a fluidization hopper (from Nordson Inc., part no. 139364) using dry compressed air. The hopper is placed on a vibrating table to enhance particle fluidization. A pneumatically activated powder pump (Nordson Inc. P/N 165637) is used to convey the powder from the hopper to a powder spray gun (Nordson Inc. type Versa Spray II IPS, P/N 107016E). The powder transfer rate is controlled from the control unit (Nordson Inc. P/N 106991C). A pressure setting of 0.9 bar is used for the atomization air, a setting of 2.5 bar is used for the fluidization air. This results in a powder transfer rate of around 0.2 kg/hr. The charge of the electrode inside the powder spray gun is set to approximately 65 kV. The powder spray gun is then placed inside a ventilated booth (Nordson Inc. type Micromax) to ensure that no powder dust escapes. A mesh belt (Wirebelt Ltd, UK) traverses the booth. The powder gun is placed below the mesh belt, such that the powder is sprayed upwards. At the tip of the spray gun, a flat spray nozzle is fitted such that the plane of the powder spray is perpendicular to the direction of the belt. Pouches are placed onto the belt at the feeding side such that the thermoformed side is in contact with the belt. They are then spray coated and collected at the discharge side of the belt. By this method there is a wide distribution of powder coating levels, with some pouches having visible powder clumps on the pouches, and some with insignificant levels of powder whereby the pouches feel "greasy" to the touch and hence had poor flow properties.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble pouch comprising a first sheet of polyvinyl alcohol or modified polyvinyl alcohol molded to form a body portion of the pouch, wherein the pouch:
   a. contains a first liquid cleaning composition; and
   b. an outer surface of the pouch which is coated with a second composition consisting of: zeolite; and fumed silica flow aid, wherein the fumed silica flow aid is present in the second composition by weight percentage from 0.1% to 2%.

2. The water soluble pouch according to claim 1, wherein the first liquid cleaning composition is a laundry, fabric care, dish washing, hard surface cleaner, pre-treatment, rinse additive, bleach-additive, shampoo, or body wash composition.

3. The water soluble pouch according to claim 1, wherein the first liquid cleaning composition is a laundry detergent composition.

4. The water soluble pouch according to claim 1, wherein the first liquid cleaning composition comprises from about 1& to about 80%, by weight of the first liquid cleaning composition, of a surfactant.

5. The water soluble pouch according to claim 4, wherein the first liquid cleaning composition comprises from about 5% to about 50%, by weight of the first liquid cleaning composition, of the surfactant.

6. The water soluble pouch according to claim 4, wherein the surfactant comprises anionic and nonionic surfactants.

7. The water soluble pouch according to claim 4, wherein the surfactant is selected from the group consisting of anionic surfactant, nonionic surfactant, zwitterionic surfactant, cationic surfactant and mixtures thereof.

\* \* \* \* \*